Dec. 26, 1944.   A. SORENSEN   2,365,976
TELESCOPE SIGHT MOUNTING
Filed May 26, 1942   2 Sheets-Sheet 1
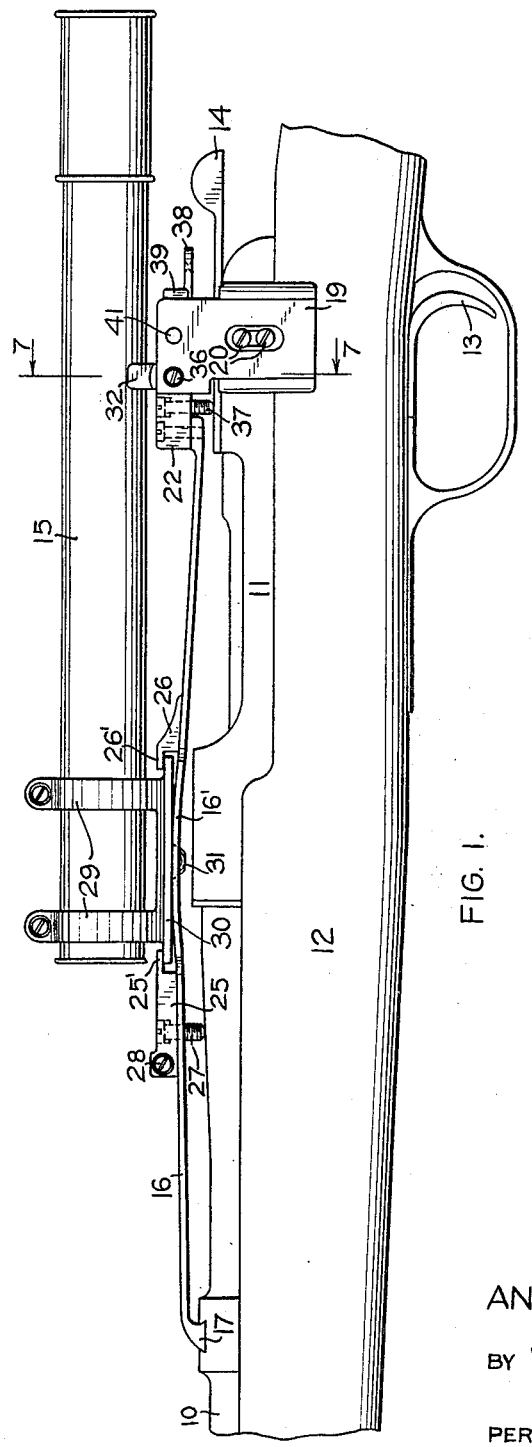
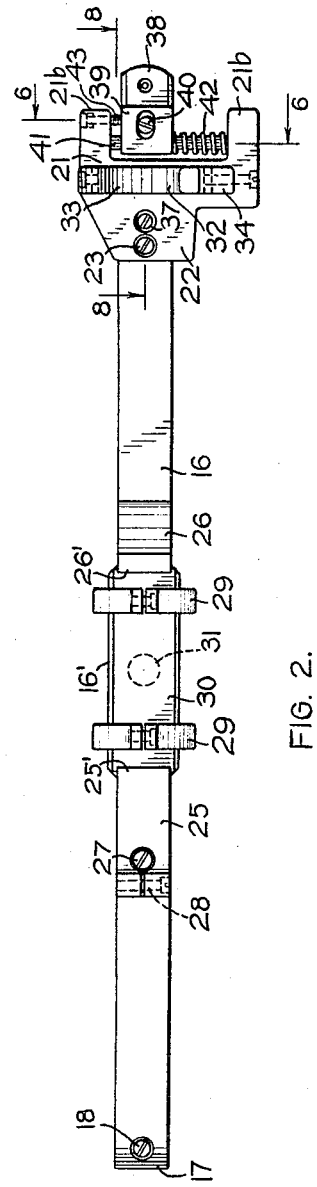
ANDREW SORENSEN,
INVENTOR
BY WHITEHEAD & VOGL
ATTORNEYS Dec. 26, 1944.  A. SORENSEN  2,365,976

TELESCOPE SIGHT MOUNTING

Filed May 26, 1942  2 Sheets-Sheet 2

ANDREW SORENSEN,
INVENTOR

BY WHITEHEAD & VOGL
ATTORNEYS

PER *Earle Whitehead*

33. GEOMETRICAL INSTRUMENTS.

Patented Dec. 26, 1944

2,365,976

UNITED STATES PATENT OFFICE 2,365,976

TELESCOPE SIGHT MOUNTING

Andrew Sorensen, Windsor, Colo., assignor of one-half to F. D. Giddings, Larimer County, Colo.

Application May 26, 1942, Serial No. 444,539

7 Claims. (Cl. 33—50)

This invention relates to sight mountings for fire arms, and more particularly to the rear sight mountings of rifles, and, primarily, to mountings for telescope sights.

Usually a telescope sight is needed on a rifle only part of the time, a peep sight being used at other times. The removal of the telescope from and replacement thereof on the rifle frequently have to be performed with cold or gloved hands and under other difficult conditions, all of which make most desirable, if not essential, simplicity and speed of operation, performance thereof by hand, without tools, and the elimination of small parts requiring adjustment, replacement or removal (with resulting danger of loss) incidental to the removal or replacement of the telescope.

The present invention provides improved structures for meeting these needs while assuring automatic and exact seating of the telescope on the rifle combined with means for cushioning the recoil and automatically and exactly reseating the telescope after each recoil.

Otherwise stated, objects of the invention are to provide an improved telescope sight mounting which permits of convenient removal and replacement of a telescope sight on and in operative relation with a rifle; to provide an improved telescope sight mounting which facilitates removal and replacement of the telescope element in a definite, predetermined relationship with the associated rifle; to provide an improved telescope mounting adapted to absorb and cushion recoil effect on the sight and to automatically and exactly reseat the telescope after such recoil; to provide an improved telescope sight mounting arranged for convenient adjustment to accommodate windage and range variations; to provide an improved association of an alternatively-usable peep sight with a telescope sight mounting, whereby said peep sight is available for immediate use by simple manual operation upon removal of the telescope.

A further object of the invention is to provide an improved telescope sight mounting that is simple and inexpensive of manufacture and installation, positive and efficient in use, susceptible of all necessary and desirable adjustments, and which is not easily accidentally displaced from its adjusted relationship with a rifle.

With these and other objects in view, all of which will more fully hereinafter appear, my invention comprises certain novel constructions, combinations and arrangements of parts, as will be hereinafter more fully described and claimed, and as illustrated in the accompanying drawings, in which Fig. 1 is a side elevation of a portion of a rifle wherewith my improved mounting is associated for practical use, illustrating a telescope sight mounted therein.

Fig. 2 is a plan view of the mounting shown in Fig. 1, with the telescope sight omitted.

Figure 3:
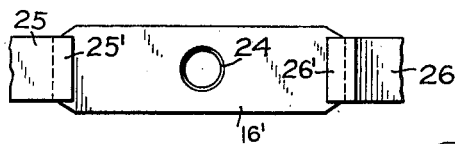
Fig. 3 is a fragmentary, detail plan view, on an enlarged scale, of mounting and attaching means employed in the invention.
Figure 6:
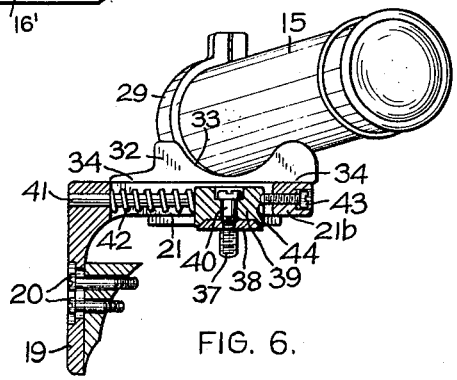
Fig. 6 is a cross section, on an enlarged scale, taken substantially on the indicated line 6—6 of Fig. 2, and showing a telescope in an angular position relative to the rifle during the mounting operation.
Figure 4:
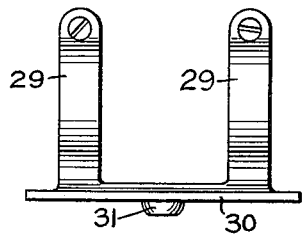
Fig. 4 is a side elevation, on the same scale as Fig. 3, of a mounting clip adapted for association with the structure shown in Fig. 3.
Figure 5:
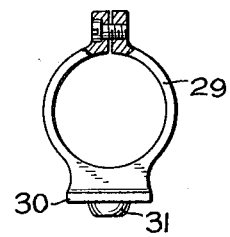
Fig. 5 is an end view, partly in section, of the showing of Fig. 4.
Figure 7:
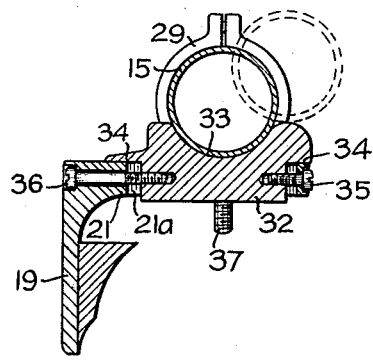
Fig. 7 is a cross section, on an enlarged scale, taken substantially on the indicated line 7—7 of Fig. 1.
Figure 8:
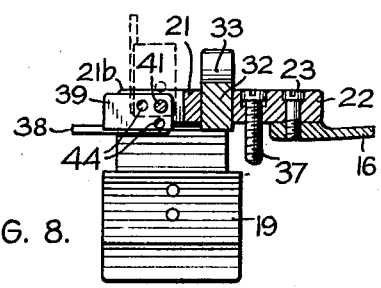
Fig. 8 is a fragmentary, detail section, on an enlarged scale, taken substantially on the indicated line 8—8 of Fig. 2.

In the construction of the improvement as shown, portions of a typical rifle are conventionally illustrated as including a barrel 10, receiver 11, a forestock 12, the usual trigger 13, and a safety lever 14, which elements comprise that portion of the rifle wherewith the rear sight is commonly associated.

A typical telescope sight 15 is illustrated conventionally as of elongate, cylindrical form, and is shown in Fig. 1 as positioned and supported above the receiver 11 in longitudinal and substantially parallel alignment with the barrel 10 so that the sight axis of the telescope may co-operate with the usual front sight of the rifle for sighting and aiming the rifle.

The improved sight mounting is designed to support the telescope 15 at spaced points on its length and to provide for altitudinal and lateral adjustment of the telescope sight axis. To mount and support the forward portion of the telescope 15, a relatively long, flat, stiff spring member 16 is positioned longitudinally along and in spaced relation above the receiver 11 and a rearward portion of the barrel 10, the forward end of said spring 16 preferably being curved downwardly to terminate in a tapered boss 17 adapted to slidably engage within a dovetailed, upwardly opening notch formed laterally of the upper side of the barrel, and be therein secured by means of a screw 18 engaging through said boss and with said barrel. Rearwardly of the receiver 11, an L-shaped bracket is disposed with its vertical leg 19 against one side of the gun assembly and secured for altitudinal adjustment relative thereto by suitable means, as screws 20 engaging through an elongated slot in said leg 19 and with elements of the receiver assembly; an angularly-related arm 21 of the bracket being consequently disposed transversely of and above a rear portion of the receiver 11, or associated gun elements. An integral lug 22 is formed on and extends forwardly from the arm 21 above the gun receiver elements, and the rearward end of the spring 16 engages beneath said lug 22 and is firmly secured thereto as by means of a screw 23 engaging through said lug and with the rearward end of said spring.

An intermediate portion of the spring 16, preferably above the forward portion of the receiver 11, is formed with an upwardly-offset bow 16', in the central portion whereof is provided an upwardly-opening recess 24 having converging walls. Lugs 25 and 26 are fixed to and rise from the spring 16 on the forward and rearward sides, respectively, of the bow 16', and opposed inner margins of said lugs are undercut laterally of the spring 16 to provide opposed fingers 25' and 26', respectively, overlying the zones of departure of the bow 16' from the normal plane of the spring. A screw 27 engages through the lug 25 and spring 16 to bear against a point on the upper surface of the barrel 10, so that rotation of said screw may operate to vary the spacing between said spring and barrel, and a forward portion of the lug 25 is preferably bisected in a vertical plane and provided with a laterally-disposed screw 28 whereby said lug portions may be clamped firmly against screw 25 to hold the latter in its desired position of adjustment.

The forward portion of the telescope 15 is embraced within and firmly clamped by a pair of spaced yokes 29 which rise in fixed parallel relation from a flat plate 30. The plate 30 has a width approximately equal to that of the spring bow 16' and a length greater than the spacing between the fingers 25' and 26', and a boss 31, having converging sides fixedly depends from the lower surface of said plate in position to engage and seat within the recess 24 and provide a center about which said plate may be swung to engage end margins of said plate beneath the fingers 25' and 26', space to allow such swinging of plate 30 and for other purposes hereinafter described, being provided at each end of plate 30 beneath said fingers as clearly shown at Fig. 1. It will be understood that the convergence of the walls of recess 24 and of the sides of boss 31 may be along either straight or curved lines— either conical or spherical—the curved or spherical form being illustrated in the drawings and being preferable. The curvature of the bow 16' is such as to firmly hold the engaged ends of said plate against said fingers when the elements are related as shown in Figs. 1 and 2.

The arm 21 of the L-shaped bracket is provided with a vertically-opening, transverse slot 21a wherein is slidably received a downward extension of a saddle block 32. The block 32 projects upwardly from the plane of the arm 21 and is formed with an arcuate seat 33 conforming in outline with the curvature of, and adapted to receive, the rearward portion of the telescope 15, and said block is provided with projecting lugs or flanges 34 adapted to slidably seat on the upper surface of the arm 21. The downward extension of the block 32 has a length less than that of the slot 21a, so that said block may be adjusted along said slot and laterally of the gun assembly, suitable means, such as adjusting screws 35 and 36, engaging through opposite end portions of said arm and with the lower extension of said block to position and hold said block in the desired lateral adjustment.

Altitudinal adjustment of the L-shaped bracket carrying the block 32 is controlled by means of an adjusting screw 37 engaging through the lug 22 and bearing against the upper portion of the receiver 11, and such adjustment of the bracket determines and fixes the position of the rearward portion of the telescope relative to the rifle. The altitudinal disposition of the forward end of said telescope is adjusted and determined by means of the screw 27 and the spacing of the spring 16 from the barrel 10 controlled thereby.

The elements of the improvement thus far described constitute a complete operative mounting for the telescope 15. With the spring 16 and L-shaped bracket secured to the gun in the manner shown and described, and with a forward portion of said telescope embraced within the yoke clamps 29, the telescope may be mounted to function as a rear gun sight by first engaging the boss 31 in the spherical recess 24 while the telescope is held at such an angle with the gun as will permit the plate 30 to seat against the convex side of the bowed spring portion 16' while end portions of said plate are in clearing relation with the fingers 25' and 26' of the lugs 25 and 26. With the boss 31 engaging its recess 24 in the manner above stated, the rear portion of the telescope 15 is swung toward the gun about the pivotal center supplied by the engaged boss and recess while downward pressure is maintained on the forward end of the telescope and its associated clamp to depress the spring bow 16' sufficiently to permit engagement of end portions of the plate 30 beneath the fingers 25' and 26', such engagement being established sufficiently to firmly hold the forward portion of the telescope to the spring 16 before the rear portion of the telescope encounters the saddle block 32.

One or both of the upstanding side margins of the saddle block 32 may preferably be contoured to eliminate abrupt angles and to facilitate upward and inward travel of the telescope to its seat on the saddle block, and such setting of the telescope in the desired alignment with the gun barrel is completed by lifting and pivotally moving the rearward portion of the telescope until the body of the telescope registers with and seats against the correspondingly concaved upper margin of the saddle block, the resilience of the spring 16 accommodating such lifting of the rear telescope portion and functioning to firmly hold such telescope portion against its seat on the block 32, and the slidable engagement of the ends of the plate 30 beneath the fingers 25' and 26' permitting said plate 30 and the telescope 15 to pivot about the center provided by the boss 31 and recess 24 until the telescope body is fully seated in the block 32. Obviously, removal of the telescope is quickly and conveniently accomplished by reversing of the steps above outlined, all without any change in the adjusted setting of the sight-supporting elements, and with the assurance that the telescope, having once been removed from its mounting, can quickly and easily be returned to operative association with the gun in the exact sighting relationship previously established.

Altitudinal adjustment of the forward end of the telescope 15 for range determination of the gun is had through the screw 27; altitudinal adjustment of the rear portion of the telescope, for initial setting or subsequent variation of the sight axis relative to the gun bore, is had through the agency of the screw 37; and lateral adjustment of the sight axis to accommodate windage is had by moving the saddle block 32 transversely of the gun and relative to the bracket arm 21 by means of the opposed screws 35 and 36, the telescope 15 pivoting to follow such adjustment about the center provided by the boss 31 and recess 24.

It is to be particularly noted that the improved sight mounting illustrated and above described not only firmly and accurately positions and holds a telescope sight on and in adjusted relation with a gun, but also protects the sight and its securing elements against damage and change of adjustment which might otherwise result from the recoil of the gun, in that the spring 16 is resilient and hence yieldable to an extent sufficient to protect the telescope against recoil shocks and in that the rear portion of the telescope slidably engages and is resiliently held against the upper margin of its supporting block, so that relative travel under recoil shock is possible between said elements.

It will be noted that, in addition to the general resiliency of mounting afforded by spring 16 and the slidable seating of the telescope in block 32, this invention provides wholly new and novel means for absorbing or cushioning the recoil shock by permitting a slight longitudinal displacement of the telescope relative to its mounting but assuring the automatic and exact reseating of the telescope in its mounting immediately following the recoil, thus protecting the telescope and its mounting from damage by the recoil while assuring exact sighting position of the telescope on the rifle at all times except at the instant of slight displacement by the recoil.

This result is obtained by the bowing of spring 16 as at 16', the spherical seat 24, the spherical lug 31 and the provision for longitudinal movement of plate 30 beneath fingers 25' and 26' by reason of the space, beneath said fingers, at the ends of the plate 30. This structure provides for a new and novel reaction of the parts to the shock of the recoil.

The recoil forces the rifle rearwardly, that is to the right as viewed at Fig. 1. The only thing which holds the telescope against longitudinal movement relative to the rifle is the spherical lug 31 seated in spherical recess 24. This seating is firm but resilient by reason of the upward pressure of bow 16' against plate 30 which is slidably held from above by fingers 25' and 26'. The force of the recoil is, therefore, exerted by the forward wall of recess 24 against the forward face of boss 31. By reason of the contour of said wall and face, the inability of the boss to move upwardly and the inertia of the telescope which carries boss 31, bow 16' is forced slightly downward and the rifle with its associated parts moves rearwardly, slightly, relative to the telescope, fingers 25' and 26' sliding on the top of plate 30, the body of lug 25 moving slightly closer to the forward end of plate 30. Block 32, coincidently, slides rearwardly under telescope 15.

On completion of the recoil, the upward pressure of bow 16' exerted on the forward face of boss 31 by the forward wall of recess 24 causes plate 30 (carrying the telescope) to slide, on the underside of fingers 25' and 26', back to normal position, with boss 31 fully seated in recess 24, whereby the telescope is returned exactly to its normal sighting position. The recoil has had no effect upon the rear of the telescope except that there has been a slight longitudinal relative reciprocation of block 32 and the telescope.

The relation of the telescope sight mounting elements with the gun structure, and the conveniently removable character of the telescope sight, facilitate association of a peep sight in alternatively usable relation with the telescope sight mounting. The peep sight is preferably adjustably associated with the mounting elements in a manner which permits of its being carried in inoperative position when the telescope sight is employed and, being shifted by simple manual movement, to operative position when the telescope is removed.

The peep sight is shown as a conventional apertured leaf 38 with parallel, beveled, side margins which slidably engage in a correspondingly-beveled recess formed as a slide bearing on one side of a block 39, to which the leaf 38 is adjustably held by means of a screw 40 engaging through an elongated slot in said block and with said leaf. The block 39 is slidably and pivotally mounted on a straight pin 41 which engages between spaced, rearwardly-extending, marginal portions 21b of the bracket arm 21, the block 39 being thus mounted to slide transversely of the gun on the pin 41 and to swing through a vertical arc about said pin to position the peep sight for cooperation with the front sight of the gun when the telescope is removed.

An expensive coil spring 42 engages about the pin 41 and bears between the block 39 and one of the portions 21b of the arm 21 to urge said block to one limit of its range of travel on said pin, and an adjusting screw 43 threadedly engages through an opposite portion 21b of the arm 21 to bear against the side of said block 39 opposite the spring 42, suitable recesses 44 being formed in the side of the block engaged by the screw 43 and functioning to alternatively receive the inner end of said screw and thereby hold the block 39 in either of two positions. One of said recesses 44 is positioned to cooperate with the screw 43 and hold the block 39 with its peep sight out of operative position, while the other of said recesses is positioned to cooperate with said screw and hold the block 39 upright with the peep sight operatively disposed.

The screw 43 has a further function in that it may be employed to move the block 39, and consequently the peep sight, along the pin 41 for adjustment of said sight laterally of the gun to accommodate windage, or for other purposes, and the yieldable character of the spring 42 facilitates actuation of the peep sight between its operative and inoperative positions without the necessity for changing the adjustment determined by the screw 43.

Functionally the telescope 15 and the clip composed of yokes 29, plate 30 and boss 31, are a unit and are removable from and replaceable on the rifle as a unit. All other parts of the structure are, functionally, unitary with the rifle. Accordingly, there are but two units—the rifle and the telescope. Functionally, there are no screws, clips or gadgets of any kind which have to be adjusted or removed in connection with either the removal or replacement of the telescope or with the shift of the peep sight from and to operative and inoperative positions. Consequently, there is no danger of losing or misplacing small parts during any of the contemplated operations.

It will also be noted that, when removed, the telescope unit has no parts which project greatly beyond the body of the telescope and that the unit may be inserted, for carriage, in a very small case. The same is true of the rifle unit. It has no greatly projecting points to interfere with its insertion in an ordinary rifle case.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim:

1. A rear gun sight mounting comprising, a spring member adapted to be fixed at its ends to and in bridging relation longitudinally of a rear portion of a gun, a telescope clamp member swivel-clampable to a forward, upper portion of said spring member, a block, laterally adjustable but in otherwise fixed relation with the rear portion of said spring member, and a saddle on the upper margin of said block being adapted to longitudinally slidably seat one end portion of a telescope sight, the other end portion of which telescope is engaged in said clamp member.

2. A rear gun sight mounting comprising, a spring member adapted to be fixed at its ends to and in bridging relation longitudinally of a rear portion of a gun, means for adjusting the altitudinal spacing of forwardly-intermediate and rear portions of said spring member relative to said gun, a telescope clamp member swivel-clampable to a forwardly-intermediate portion of said spring member, a laterally-adjustable block in otherwise fixed relation with the rear portion of said spring member, and a saddle on the upper margin of said block contoured to seat a telescope body.

3. A rear gun sight mounting comprising, a spring member, means for securing the forward end of said member to a gun to mount said member in longitudinally-bridging relation with a rear portion of the gun, a bracket associated with the rear end of said member and engageable in altitudinally-adjustable relation with the gun, a telescope clamp member swivel-clampable to a forwardly-intermediate portion of said spring member, a laterally-adjustable block in otherwise fixed relation with an upper portion of said bracket, and a saddle on the upper margin of said block contoured to seat a telescope body.

4. A rear gun sight mounting comprising, a spring member adapted to be fixed at its ends to and in bridging relation longitudinally of a rear portion of a gun, said member having an upwardly-curved bow in its forwardly-intermediate portion, there being a recess centrally of said bow, lugs formed with transversely-undercut adjacent ends fixed to said spring member adjacent the opposite ends of said bow, a telescope clamp member including a plate having projecting ends adapted to engage within the undercuts of said lugs, a boss depending centrally from said plate for swiveling engagement within said recess, whereby said plate and its associated elements may be pivotally engaged with the spring bow for rotation to engage its ends within the undercuts of said lugs and thereby removably mount said clamp and the portion of a telescope engaged thereby on and above said spring member, a block adjustable transversely adjacent the rear end of said spring member, and a saddle on the upper margin of said block contoured to seat a telescope body.

5. A rear gun sight mounting comprising, a spring member formed with an upwardly-curved bow in its forwardly-intermediate portion, a down-turned forward end on said spring member engageable with a transverse seat on a gun, means for securing said forward end of the spring member to its seat, an L-shaped bracket secured to the rear end of said spring member, means for adjustably attaching a depending leg of said bracket to a side margin of said gun to position the arm of said bracket in spaced relation transversely above a rear portion of the gun, a block slidably associated with said transverse bracket arm for adjustment laterally relative to said spring member, transversely-undercut lugs fixed to said spring member on opposite sides of said bow with their undercut ends in spaced opposition, a telescope clamp member including a plate arranged to pivotally center on said bow and having end portions engageable within the undercuts of said lugs, and a saddle on the upper margin of said block contoured to seat a telescope body.

6. In a mounting of the character described having an elongate spring member fixed to and in bridging relation longitudinally above the rear portion of a gun, means for detachably securing a telescope to said spring member, said means comprising a flat plate formed with spaced, upstanding clamps adapted to embrace and hold a forward portion of a telescope, a boss depending centrally from said plate, an upwardly-curved bow in a forwardly-intermediate portion of said spring member, there being a recess opening centrally from the convex surface of said bow and adapted to receive and seat said boss, said boss and recess having co-matingly converging walls, means acting to retain said boss in said recess comprising lugs fixed to the upper surface of said spring member on opposite sides of said bow, said lugs being undercut transversely and adapted to receive and frictionally hold ends of said plate when the latter is rotated into alignment with said spring member about the center resulting from engagement of said boss within said recess.

7. In a mounting of the character described, an elongate spring member fixed at its forward end to a gun and extending longitudinally of and above a rear portion of the gun, an altitudinally-adjustable bracket secured to said gun and having an arm disposed transversely of and above the gun and engaging with the rear end of said spring member, and means for swivel-clamping the forward end of a telescope to a forwardly-intermediate portion of said spring member, means for supporting and positioning the rearward portion of a telescope, said means comprising a slot opening through the transverse arm of said bracket laterally of the gun, a block slidably upstanding from said transverse arm and formed with a depending portion slidably engaging within said slot, screws adjustably carried by said transverse arm and bearing against ends of the depending block portion, and a seat formed in the upper margin of said block contoured to receive and partially embrace a rearward portion of the telescope.

ANDREW SORENSEN.